US008798242B1

(12) United States Patent
Sankaranarayanan

(10) Patent No.: US 8,798,242 B1
(45) Date of Patent: Aug. 5, 2014

(54) VOICE-RELATED INFORMATION IN DATA MANAGEMENT SYSTEMS

(71) Applicant: EMC Corporation, Hopkinton, MA (US)

(72) Inventor: Hari Bhaskar Sankaranarayanan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/626,092

(22) Filed: Sep. 25, 2012

(51) Int. Cl.
*H04M 1/64* (2006.01)

(52) U.S. Cl.
USPC .................................. 379/88.22; 379/265.03

(58) Field of Classification Search
CPC .. H04M 3/533; H04M 3/53333; H04M 3/493
USPC ................ 379/88.01, 88.09, 112.06, 201.02; 707/765
See application file for complete search history.

(56) References Cited

U.S. PATENT DOCUMENTS

| | | | | |
|---|---|---|---|---|
| 6,922,466 | B1 * | 7/2005 | Peterson et al. | 379/88.09 |
| 7,801,910 | B2 * | 9/2010 | Houh et al. | 707/765 |
| 8,494,133 | B2 * | 7/2013 | Jeffs et al. | 379/112.06 |
| 2006/0198504 | A1 * | 9/2006 | Shemisa et al. | 379/201.02 |

OTHER PUBLICATIONS

Tag Cloud, Wikipedia, the free encyclopedia, Aug. 2012, pp. 2-6.

* cited by examiner

*Primary Examiner* — Fan Tsang
*Assistant Examiner* — Van D Huynh
(74) *Attorney, Agent, or Firm* — Van Pelt, Yi & James LLP

(57) ABSTRACT

An instruction including one or more criteria is received. It is determined, based at least in part on the criteria, at least voice-related information in storage to which the instruction applies; the voice-related information includes call audio data, a call transcript, and call metadata associated with a call. The instruction is performed at least on the determined voice-related information.

28 Claims, 13 Drawing Sheets

Customer Information  ― 502

| | Customer Name | Nancy Paul |
|---|---|---|
| | Address | 123 Main Street |
| | Status | VIP Member |
| | Customer ID | 7888 |
| Telephone | Email | Date of Birth |
| (123) 456-7890 | nancy@email.com | January 1, 1970 |

Call Audio (SR899)   508    ― 504

506

<Time from Start>                    <Time to End>

Call Transcript (SR899)   ― 510

Service Representative: (Good) morning.
Customer: Good morning. I'm (calling) to check on the (status) of a car insurance (claim) I submitted last week.
Service Representative: (May) I have your policy (number) please?
Customer: My policy number (is) 1234.

512

Call Transcript Search Criteria   ― 520

[Search Call Text]

Related   ― 530

| Service Request ID | Case File | Call Audio | Call Text | Call Date | Call Length |
|---|---|---|---|---|---|
| SR281 | | ▶ | A— | August 1, 2012 | 5:13 minutes |

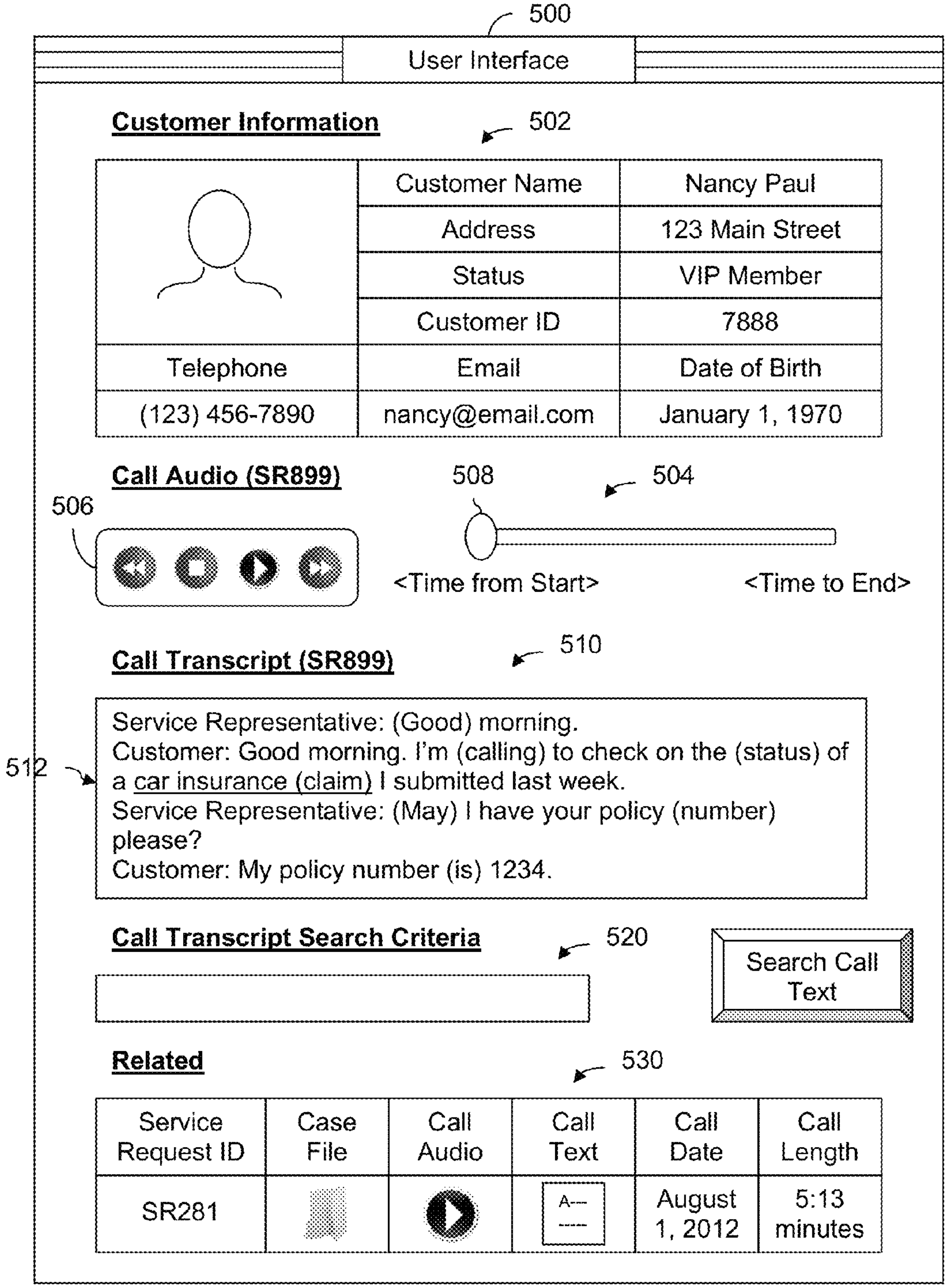

FIG. 5

VOICE-RELATED INFORMATION IN DATA MANAGEMENT SYSTEMS

BACKGROUND OF THE INVENTION

Call centers remain an important customer service interface via which companies communicate with potential and existing customers. Current systems for storing and managing voice-related information (e.g., originating from a call center) remain crude. It would be desirable if new techniques associated with storing and/or managing voice-related information were developed which enable a richer and/or a more powerful set of tools and services than currently exist.

BRIEF DESCRIPTION OF THE DRAWINGS

Various embodiments of the invention are disclosed in the following detailed description and the accompanying drawings.

FIG. 5 is a diagram showing an embodiment of a user interface configured to display a selected case file associated with a call.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
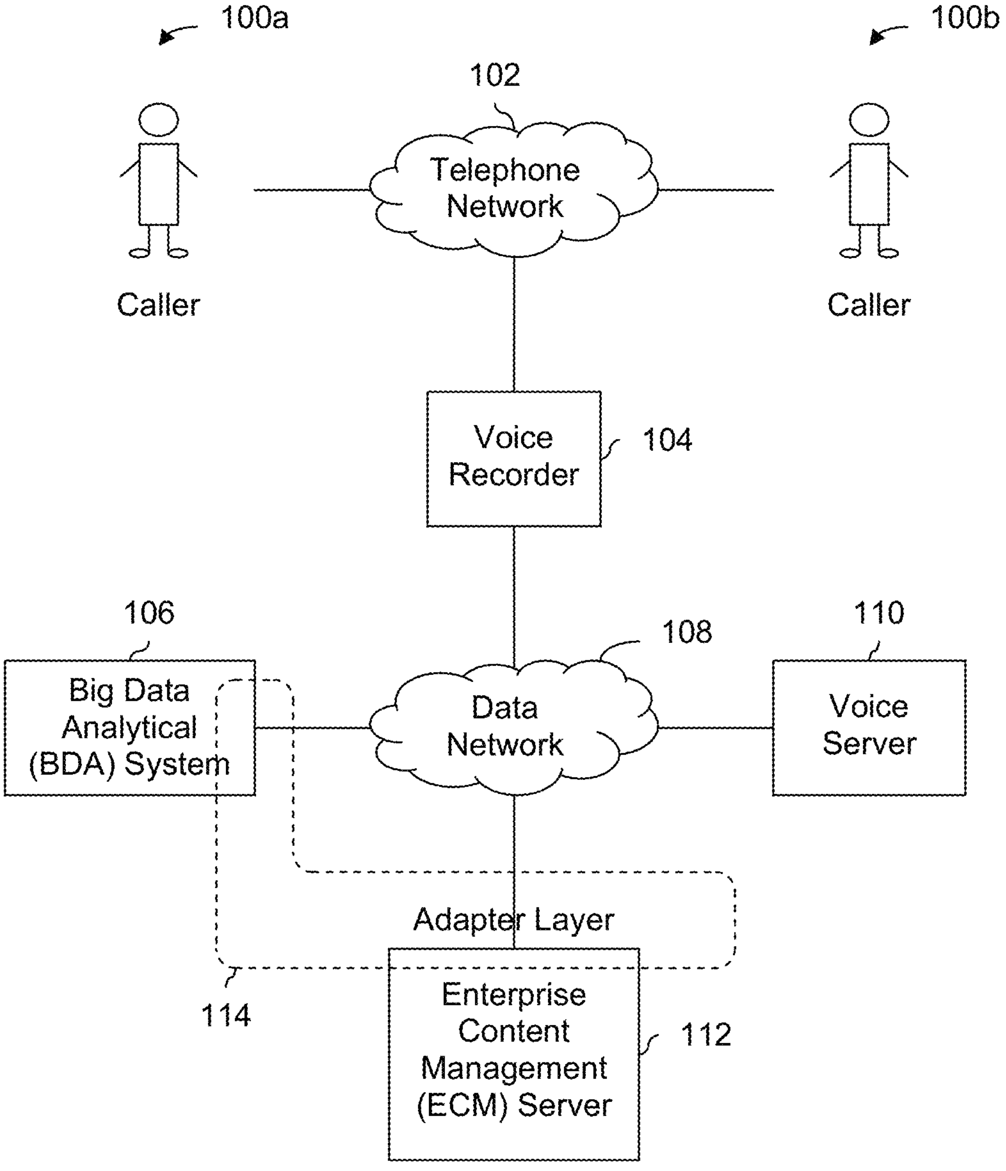
FIG. 1 is a diagram showing an embodiment of a data management system configured to manage and analyze voice-related information.

FIG. 1 is a diagram showing an embodiment of a data management system configured to manage and analyze voice-related information. In the example shown, callers 100*a* and 100*b* contact voice recorder 104 via telephone network 102. In this particular example, voice recorder 104 is a call center. For example, callers 100*a* and 100*b* may be customers of a company and voice recorder 104 handles customer inquiries, complaints, and/or transactions related to products and/or services offered by the company. In some embodiments, voice recorder 104 is staffed and managed by a third-party call center provider contracted by the company. In various embodiments, voice recorder 104 is automated (e.g., voice recorder 104 uses voice recognition technology and/or telephone keypad input by a caller to navigate through a tree of service options) and/or staffed by human operators.

Some other examples of voice recorder 104 include a medical transcription call center (e.g., where doctors call in to voice recorder 104 and dictate patient notes by telephone), a voicemail or message system (e.g., where people can leave voicemails for people), and a reporting service (e.g., where reporters call in to voice recorder 104 to record their reports for later broadcast). These examples are not intended to be limiting.

At voice recorder 104, a recording of the call is made (e.g., between a operator and a caller and/or between a caller and an automated call interface); this audio recording is hereinafter referred to as call audio data and may be in a variety of formats, including (but not limited to) Waveform Audio File Format (WAV), Moving Picture Experts Group (MPEG), MPEG-1 or MPEG-2 Audio Layer III (MP3), Windows Media Audio (WMA), or Advanced Audio Coding (AAC).

Call audio data is sent from voice recorder 104 to voice server 110 via data network 108. At voice server 110, the call audio data is transcribed, producing a call transcript. Some example voice server providers include Avaya, Nortel Networks Inc., GeniSys Global, and Cisco. Although this example shows telephone network 102 and data network 108 as separate networks, in some embodiments the two networks overlap to some degree. For example, a caller may use Voice over Internet Protocol (VoIP) to contact voice recorder 104. VoIP uses Internet Protocol (IP) to perform the call and this is one example in which networks 102 and 108 overlap.

Enterprise content management (ECM) server 112 provides tools and/or services for managing information over an information lifecycle. Documentum® by EMC is one example of ECM server 112. In general, ECM server 112 manages information (e.g., in the form of or represented as documents) over a lifecycle from "birth" to "death." In one example, information relates to a purchase and the related information migrates from an inquiry/lead state to a purchase state to a fulfilled state. In another example, information relates to medical health records and the information progresses through various states or processes related to a patient's medical care. For example, tests or procedures can be ordered, ordered tests or procedures can be fulfilled, reminders can be sent to doctors or nurses if a patient does not follow up, and so on.

Management of data over a lifecycle by ECM server 112 is performed using one or more policies (not shown) which are associated with or applied to the relevant data. A policy may describe or outline how data should be managed, what actions should occur, and so on (e.g., the sequence of purchase states described above or the sequence of medical care states described above). In some embodiments, a policy describes (at least in part) how a company internally manages data as part of doing business (e.g., with respect to fulfilling purchases, resolving customer issues, etc.). In another example, a policy may relate to data retention (i.e., how long data must be kept); this may be dictated by regulatory requirements (e.g., as required by the Securities and Exchange Commission (SEC)) or for other reasons (e.g., because the company promised to its customers to do so, because the industry standard is to do so, or the information must be retained because of related litigation). Or, a policy may relate to privacy or access, for example in order to comply with the Health Insurance Portability and Accountability Act (HIPAA) Privacy Rule regarding access to electronic medical information. Some other policy examples include policies related to auditing, logging, duplication, or forwarding.

ECM server 112 stores and manages voice-related information, including call audio data and call transcripts. In this example, the call audio data and call transcript are sent to ECM server 112 from voice server 110 via data network 108. In some other embodiments, call audio data and/or call transcripts are received from some other source (e.g., call audio data is received directly from voice recorder 104). ECM server 112 processes the call audio data and call transcript, determines appropriate policies to apply to the processed call audio data and call transcript, and applies those policies. Once processed and stored, the processed call audio data and call transcript may be accessed and managed using a graphical or command line interface. Some example user interfaces are described in further detail below.

Voice-related information managed by ECM server 112 includes metadata associated with a call (hereinafter referred to as call metadata). In some embodiments, call metadata includes information associated with the caller, such as a customer name or an account number. In some embodiments, call metadata includes information associated with properties or characteristics of a call, such as a unique service request ID (e.g., which uniquely identifies the call from other calls placed by other callers, as well as other calls made by that same caller), a date and/or time at which a call occurred, a call length or duration, or the voice recorder which received a call (e.g., a company may have multiple call center locations and/or multiple third-party call center providers on contract and a call center identifier may be a physical or logical identifier). In some embodiments, call metadata includes information associated with the content or topic of a call, such as resolution status (e.g., was the call operator able to complete the request of the caller?), a business unit or division of a company to which a call is directed (e.g., a company may have a products business unit and a services business unit (for example which provides installation or maintenance services related to the product or competing products), or a product or service about which a caller is calling.

In various embodiments, various entities generate call metadata. In some embodiments, call metadata is generated at voice recorder 104. In some embodiments, during the call, the name of the caller or a customer ID may be determined and this information is captured in call metadata and is associated with the related call audio data. In some embodiments, call metadata generated at voice recorder 104 includes a service request ID, a call center identifier, a call date or time, a call length, a physical or logical identifier of a call center, a resolution status, a business unit to which the call is directed, and/or a product or service to which a call is directed.

In some embodiments, call metadata (e.g., managed by ECM server 112) is generated by voice server 110. For example, voice server 110 may perform voice analysis to select and assign a tag or descriptor associated with a caller's mood or emotions. Some example tags or descriptors generated by voice server 110 include happy, satisfied, frustrated, and angry.

In some embodiments, call metadata is associated with a specific portion of a call transcript and/or call audio data. For example, if call metadata includes a tag related to a caller's experience (e.g., what mood or emotions the caller experienced during the call, whether the caller was satisfied, etc.), then that tag may be associated with a specific part of a call transcript and/or call audio data where the caller had that particular experience. For example, at the beginning of a call, a caller may be in a good or neutral mood. At some point in the call, the caller may receive some bad news and his mood sours. A tag of "angry" may identify where (e.g., within the call transcript and/or call audio data) the caller becomes angry. In another example, a new customer calls in to voice recorder 104 to do two things: set up automatic bill payment and acknowledge that the caller has received and understands the company's cancellation policy. Two different tags may be used to identify or point to the parts of the call transcript and/or call audio data where the two tasks are accomplished during the call. In some embodiments, such tags permits tools or services (e.g., provided by or associated with a user interface) to jump to those portions of the call transcript and/or call audio data where the desired task occurred during a call. In some embodiments, tags are used to mark the gist of customer interactions with an agent in a meaningful way for further classification and/or analysis.

Big data analytical system 106 stores large amounts of information and provides (e.g., analysis related) tools and services for use on the stored information. The amount of data managed by big data analytical system 106 is typically larger than can be effectively managed by traditional or older data management systems. For example, big data analytical system 106 may store and manage petabytes or exabytes of information, which is larger than older data management systems can handle. One example of big data analytical system 106 is the Greenplum family of products by EMC, including Greenplum Database™ (for structured data) and Greenplum HD (an enterprise Hadoop product for unstructured data). In some embodiments, big data analytical system 106 includes a massively parallel processing (MPP) database, such as Greenplum Database.

Big data analytical system 106 stores and manages call audio data (e.g., from voice recorder 104 or voice server 110), call transcripts (e.g., from voice server 110), and call metadata (e.g., from voice recorder 104 and/or voice server 110). For brevity, call audio data call transcripts, and call metadata is not repeated herein; anything herein in association with ECM server 112 is also applicable to big data analytical system 106.

In some embodiments, big data analytical system 106 and ECM server 112 serve different purposes and/or are intended for different users. Whereas ECM server 112 may be concerned with managing data or documents from "birth" to "death" over some information lifecycle (e.g., where data goes through a sequence of states and/or certain things must be done at various stages), big data analytical system 106 may instead focus on analyzing large amounts of information (e.g., in order to answer questions about how different types of customers behave, how customers react when presented with various options or situations, etc.). Put another way, in at least some cases, big data analytical system 106 analyzes data to answer questions or provide insight and ECM server 112 is concerned with data being managed in a proper or appropriate manner.

In some embodiments, a system includes some device not shown herein (e.g., in addition to and/or in place of big data analytical system 106 and/or ECM server 112). In some embodiments, a system includes an eDiscovery system, such as EMC Kazeon. For example, a company associated with voice recorder 104 may be involved in litigation (e.g., a class action lawsuit brought by customers of the company). An eDiscovery system (e.g., EMC Kazeon) may store and manage call audio data, call transcripts, and/or call metadata. Using an eDiscovery system, the stored data may be searched (e.g., by litigation counsel working on discovery) and appropriate actions may be performed on relevant data (e.g., flag as attorney-client privileged, send to opposing counsel, etc.). Although some examples described herein relate to big data analytical systems or ECM systems, the techniques are not necessarily limited to such systems.

In some embodiments, big data analytical system 106 and/or ECM server 112 manage multiple types of data and/or data from sources not shown in the example of FIG. 1. In some embodiments, web-related information (e.g., generated from and/or associated with a user's interaction with a website) is managed by big data analytical system 106 or ECM server 112. In some embodiments, account information (e.g., including account transactions) is managed by big data analytical system 106 or ECM server 112. In some embodiments, data generated from and/or associated with a person-to-person interaction (e.g., a customer goes into a bank branch and conducts an in-person transaction with a bank teller) is managed by big data analytical system 106 or ECM server 112. In some embodiments, data exchanged via email, facsimile or USPS is managed by big data analytical system 106 or ECM server 112. In one example, a company may be an insurance company and a customer may send in insurance applications, claims forms, or supporting documents via email, facsimile or USPS and copies of the documents and/or data extracted from those documents are managed by big data analytical system 106 or ECM server 112.

In some embodiments, a system uses an adapter layer (e.g., an interface which is Content Management Interoperability Services (CMIS) compliant) to exchange data. For example, voice data, call transcripts, and/or call metadata received at big data analytical system 106 and/or ECM server 112 may be received via an adapter layer. In some embodiments, an adapter layer enables the proper integration or association of various sets of data with the appropriate application programming interface (API) so that the proper process can be applied to that data (e.g., when ingested or on intake). For example, one set of data may need certain processes performed on it and a second set of data may need another set of processes performed on it. Using an adapter layer may ensure that the proper set of data is associated with and/or fed to the proper API. Similarly, one source of data may format a given piece of data differently than another (similar) source of data. Using an adapter layer may ensure uniform and consistent ingestion of data. For example, voice recorder 104 may be implemented in a variety of ways (e.g., a call center is contracted out to two or more third party call center providers) or voice server 110 may be implemented in a variety of ways (e.g., there are two or more completing voice processing systems and different voice servers are implemented differently). An adapter layer ensures the overall system will not break even if new devices are added, an implementation on a particular device changes, etc.

Figure 2:
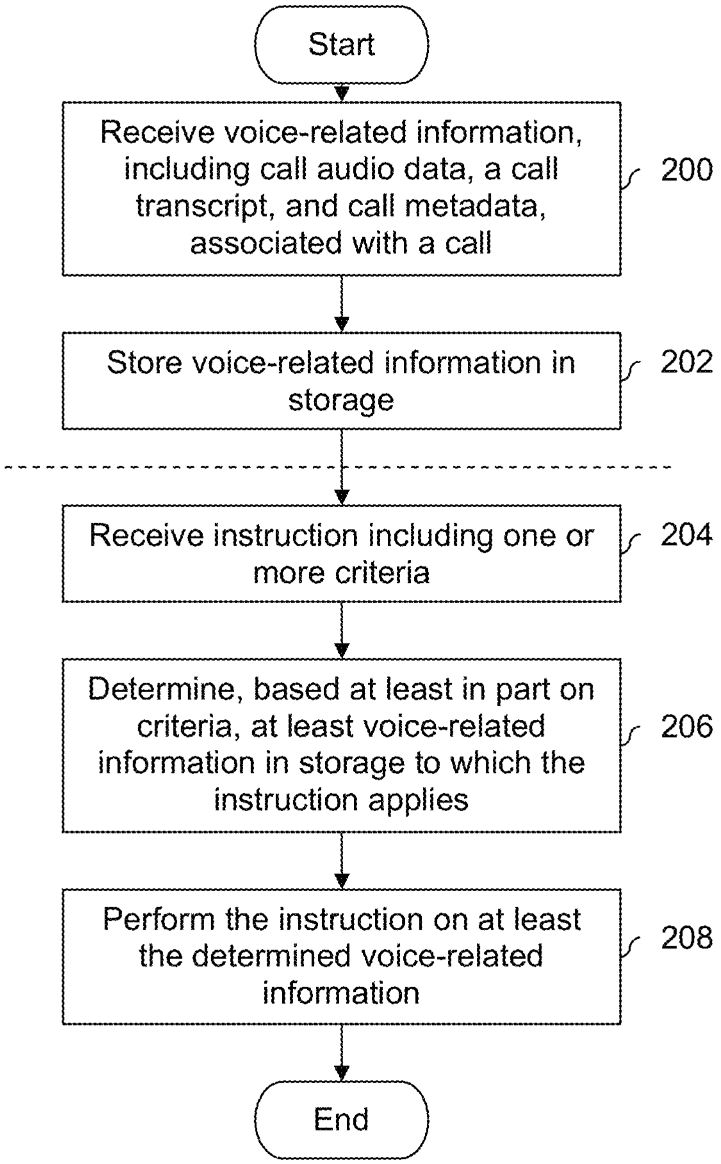
FIG. 2 is a flowchart illustrating an embodiment of a process for managing and operating on voice-related information.

FIG. 2 is a flowchart illustrating an embodiment of a process for managing and operating on voice-related information. In some embodiments, big data analytical system 106 in FIG. 1 performs the example process. In some embodiments, ECM server 112 in FIG. 1 performs the example process.

At 200, voice-related information, including call audio data, a call transcript, and call metadata, associated with a call is received. For example, the voice-related information may be received at big data analytical system 106 or ECM server 112 in FIG. 1. The call audio data, call transcript, and call metadata are stored in storage at 202.

An instruction including one or more criteria is received at 204. For example, big data analytical system 106 in FIG. 1 may receive an instruction related to analyzing data stored in big data analytical system 106. Or, ECM server 112 may receive an instruction associated with managing information (e.g., according to or using one or more policies). At 206, at least voice-related information in storage to which the instruction applies is determined based at least in part on criteria. For example, a criterion may identify what information (e.g., voice-related information, web-related information, or account information) in storage the instruction relates to.

At 208, the instruction is performed at least on the determined voice-related information. In some embodiments, the instruction is associated with applying a policy to relevant data. For example, ECM server 112 in FIG. 1 may manage information over a lifecycle using one or more policies and performing an instruction at 208 may include applying or associating a policy with data to which it is relevant or applicable (e.g., as determined at 206). In another example, big data analytical system 106 in FIG. 1 performs an instruction on specified or relevant data.

In some embodiments, performing an instruction at 208 includes updating a user interface (e.g., the same one via which an instruction is received at 204). In various embodiments, a user interface provides (e.g., to a user) mid-process updates (e.g., while steps 206 or 208 are being performed if steps 206 or 208 take a noticeable amount of time), search results, analysis results, etc.

The following figures show some user interface examples associated with steps 204, 206, and 208. The information, features, sequences, and controls described in the following figures are merely exemplary and are not intended to be limiting.

Figure 3:
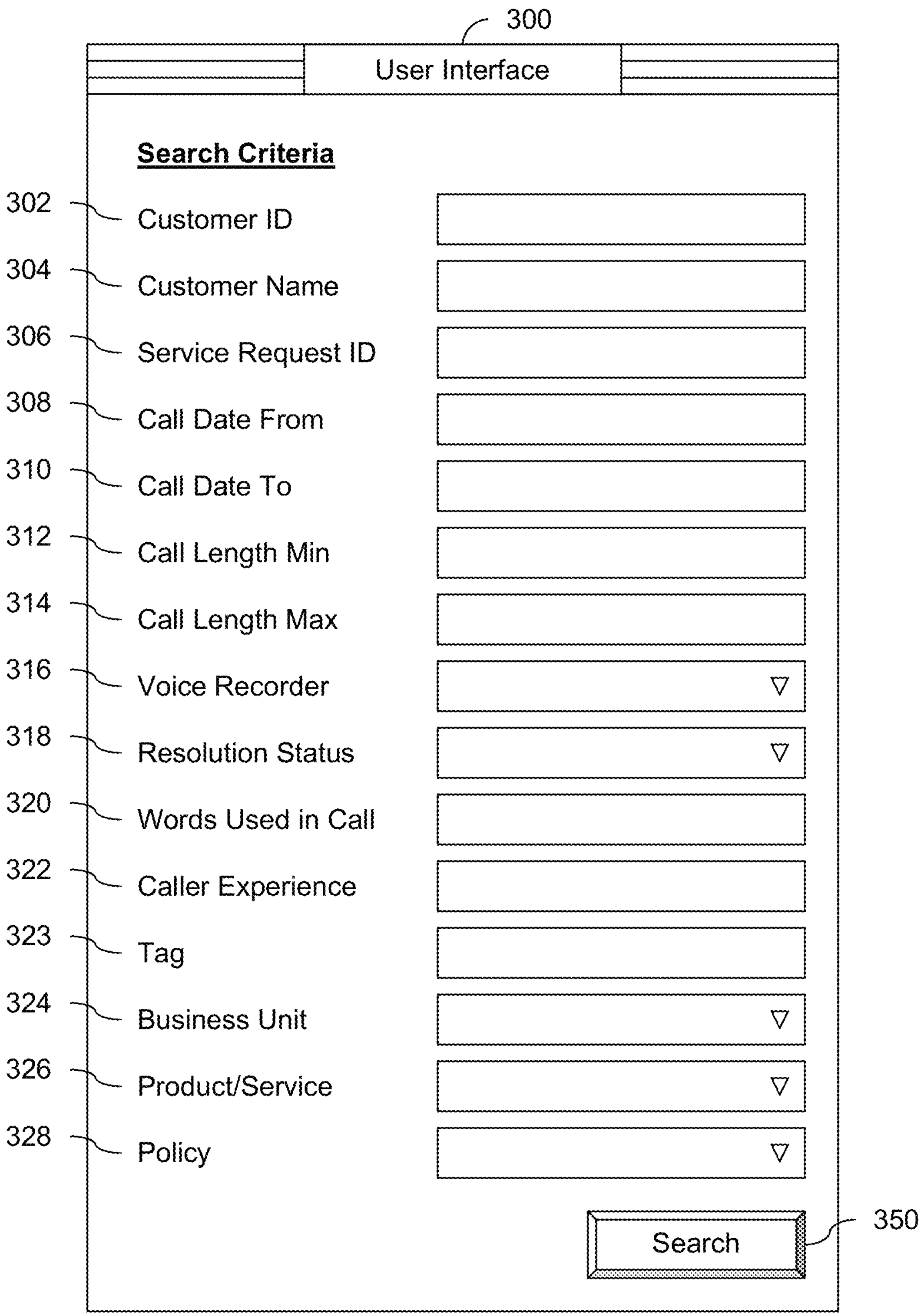
FIG. 3 is a diagram showing an embodiment of a user interface configured to receive search criteria.

FIG. 3 is a diagram showing an embodiment of a user interface configured to receive search criteria. In some embodiments, user interface 300 is used to search information stored in an ECM server (e.g., ECM server 112 in FIG. 1). In some embodiments, user interface 300 is used to search information stored in a big data analytical system (e.g., big data analytical system 106 in FIG. 1).

In the example shown, a user specifies one or more search criteria via user interface 300. Customer ID 302 is used to specify an identifier (e.g., an alphanumeric value) which uniquely identifies a customer in a system. Customer name 304 is used to specify (at least part of) a customer name to search for. A customer associated with customer ID 302 and/or customer name 304 may be an individual, a business unit within a company, or an entire company. Service request ID 306 is an identifier (e.g., an alphanumeric value) which uniquely identifies a service request; each time a call is received at a voice recorder, the call is assigned a service request identifier. Service request identifiers may be assigned to other things besides calls, such as web-based service requests, in-person service requests, and so on. Call date from 308 and call date to 310 may be used to specify a range of dates over which a call occurs. Call length minimum 312 and call length maximum 314 may be used to specify a range of call lengths. Voice recorder 316 may identify a voice recorder if there is more than one logical or physical voice recorder. For example, a voice recorder may comprise a single physical call center which is staffed by two different call center service providers and each provider is associated with a different logical identifier. Or, there may be one call center on the East Coast and another on the West Coast. Resolution status 318 indicates the resolution status at the end of a call. Some example resolution status values include: unresolved, resolved, not applicable, and don't know. Words used in call 320 may be used to specify one or more words to search for, for example in a call transcript. Caller experience 322 indicates one or more caller experiences. For example, a caller experience may relate to an emotion or mood experienced by a caller during the call. Tag 323 is a value (e.g., a string or a number) to search for in call metadata; in some embodiments a tag is used to store a field or value shown in FIG. 3, for example a tag may be used to store or indicate a caller's experience. Business unit 324 is a business unit to which a call is directed or which a call is about. For example, one business unit may be related to services and another business unit may be related to products and business unit 324 may be used to specify calls about one business unit versus the other. Product/service 326 is a product or service which a call is about. Policy 328 is a policy which is used to manage information. For example, a policy may relate to access, retention, backup, distribution, and so on.

In this example, search criteria 316, 318, 324, 326, and 328 are specified using a pull-down menu. In some embodiments, a user interface includes other controls or features such as auto-fill, radio buttons, sliders, or increase/decrease buttons.

The search criteria made available by a user interface (such as user interface 300) may vary depending upon the system. For example, if user interface 300 is provided by ECM server 112 in FIG. 1 then a policy has meaning since ECM server 112 may manage information using one or more policies. Big data analytical system 106 in FIG. 1, however, may not necessarily use policies and in such embodiments a user interface provided by big data analytical system would not include policy as a search criteria. Similarly, big data analytical system 106 in FIG. 1 may have a search criterion that ECM server 112 does not.

When a user has specified one or more desired search criteria, the user initiates the search by pressing search button 350. In various embodiments, if specified, words used in call 320, caller experience 322, business unit 324, or product/service 326 are used to search a call transcript. In some embodiments, if specified, customer ID 302, customer name 304, service request ID 306, call date from 308, call date to 310, call length minimum 312, call length maximum 314, voice recorder 316, resolution status 318, caller experience 322, business unit 324, product/service 326, or policy 328 are used to search call metadata.

Figure 4:
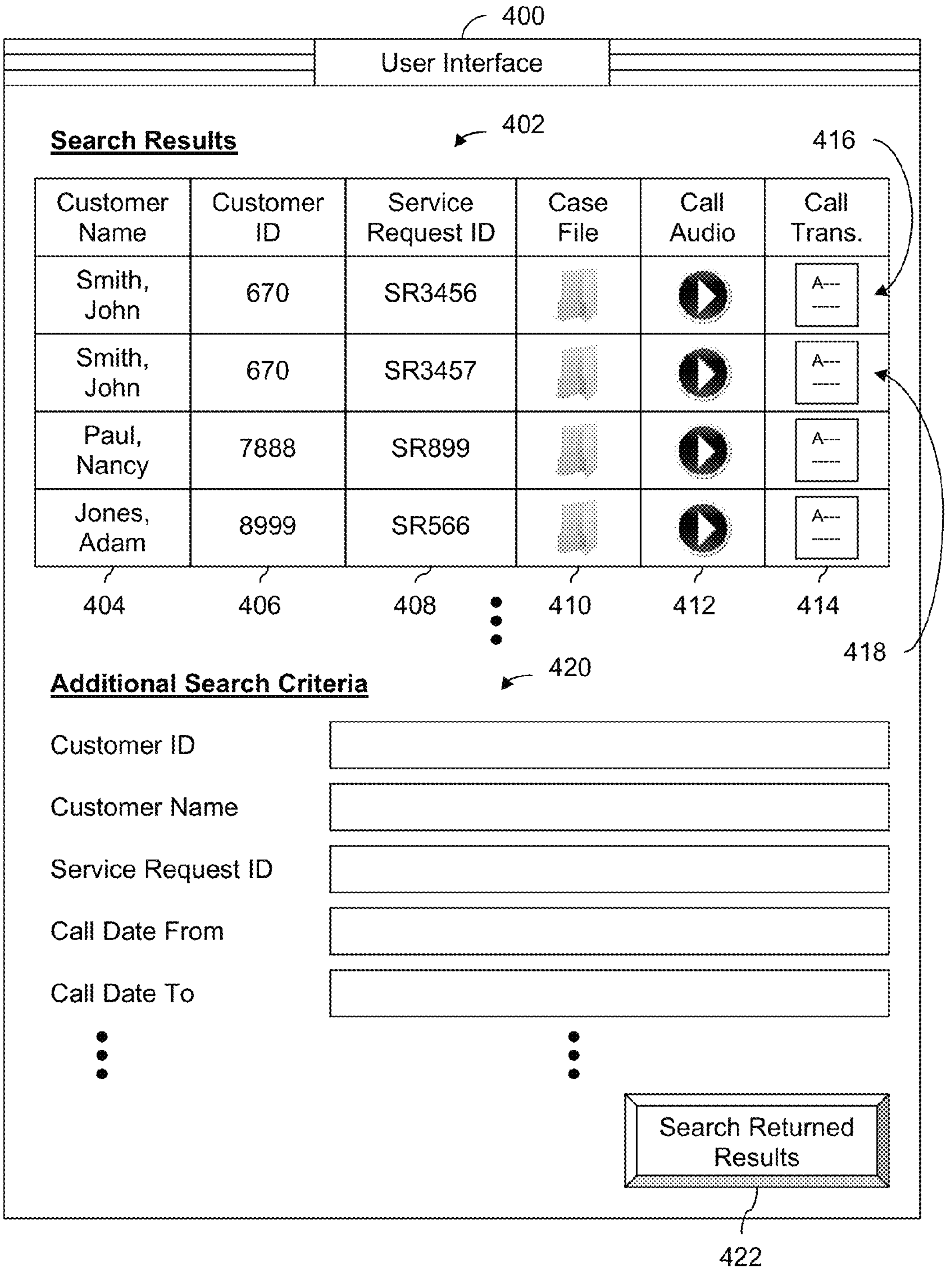
FIG. 4 is a diagram showing an embodiment of a user interface configured to display search results.

FIG. 4 is a diagram showing an embodiment of a user interface configured to display search results. In this example, the example of FIG. 3 is continued. User interface 400 includes search results 402 in response to an instruction to search using one or more specified search criteria. Search results 402 include customer name column 404, customer ID column 406, service request ID column 408, case file column 410, audio call column 412, and call transcript column 414. In this example, a case file is an abstraction of a case of a customer under consideration or investigation. It encapsulates (e.g., logically) all of the information regarding a reported problem. A case file is a collection of artifacts that includes components from various aspects of customer interaction.

Selecting (e.g., by double clicking with a mouse) a play button in call audio column 412 causes the related call audio data to be accessed and played using an audio player (e.g., Windows Media Player or a plug-in/Flash-based audio player). Selecting a file in call transcript column 414 causes the related call transcript to be accessed and displayed. In some embodiments, a displayed call transcript is able to be searched.

Search results 416 and 418 are both associated with John Smith having a customer ID of 670. The caller (i.e., John Smith) called in to a voice recorder and the call resulted in two service request IDs (i.e., SR3456 and SR3457). For example, the caller may have called in to a call center of an airline and, during a single call, requested an upgrade for his flight to New York and also requested a seat change for his flight to Los Angeles. Selecting the play button in call audio column 412 or the file in call transcript column 414 may cause an audio player or text viewer to jump to the portion of the call audio data or call transcript associated with that service request. For example, if service request SR3456 occurs at the beginning of a call and service request SR3457 occurs at the end of the same call, selecting the play button or file for search result 417 would result in the call audio data being played back in the middle of the call where SR3457 begins, or centering the display of the call transcript so that it starts in the middle where SR3457 begins.

User interface 400 includes additional search criteria 420 so that (if desired), a user is able to search through search results 402. For example, if the number of search results returned is too large, a user may reduce the number presented by specifying additional search criteria 420 and pressing search returned results button 422.

FIG. 5 is a diagram showing an embodiment of a user interface configured to display a selected case file associated with a call. In the example shown, a user has selected (e.g., by double clicking with a mouse) the case file in search results 402 of FIG. 4 and, in response, user interface 500 is presented.

User interface 500 includes customer information 502 associated with the selected case file. In this example, customer information 502 includes a picture of the customer, the customer's name, address, status (VIP member in this example), customer ID, telephone number, email address, and date of birth.

Call audio section 504 includes controls for accessing call audio associated with the selected case file. Audio player 506 includes buttons for rewinding, stopping, playing, and fast forwarding the call audio data. Slider 508 indicates the time elapsed from the beginning and the time remaining until to the end. In this example, slider 508 may be used to jump to different parts of the call, for example by "grabbing" slider 508 and moving it to the left (e.g., to rewind) or moving slider 508 to the right (e.g., to fast forward). In some embodiments, if a call includes more than one service request, call audio data which is accessible via call audio section 504 may start/end according to where a service request is determined to start/stop within the call.

Call transcript 510 includes a call transcript. In some embodiments, if a call includes more than one service request, the portion of the call transcript presented in call transcript 510 corresponds to the part of the call corresponding to the particular service request.

The call transcript presented in call transcript 510 is interactive in a variety of ways. Using call transcript search criteria 520, one or more words within a call transcript may be searched for. Search results may be indicated in call transcript 510 using visual indicators, such as a colored highlight, font color, italics, bold, and/or underlines (not shown).

Another interactive feature of call transcript 510 is the inclusion of links to related artifacts; links in this example are indicated with an underline but may be indicated in some other manner. In this example, selecting link 512 (e.g., by double clicking on link 512) causes an artifact associated with the car insurance claim to be displayed. In general, an artifact may be any object or data in support of or related to the related (e.g., underlined) portion of the call transcript. Example artifact(s) presented in response to selecting link 512 include: a completed claims form, a copy of a police report, a copy of the insurance card of another driver involved in the accident, a receipt from a mechanic, and/or a picture of the damage to a car. Other embodiments present artifacts in some other manner. For example, an artifact may be displayed by positioning a pointer above a link (e.g., a roll-over).

Another interactive feature of call transcript 510 is the linking of call transcript 510 with call audio 504. In this example, selecting (e.g., by double clicking) a word in call transcript 510 causes the call audio data to begin playing at the selected word. In some embodiments, call metadata is used to record associations between a given word in a call transcript and a corresponding time or point within call audio data. In some embodiments, an associated time is stored in call metadata for every word in call transcript 510. In some embodiments, an associated time is stored in call metadata for only a subset of words in a call transcript and interpolation is used to determine times which are not stored in call metadata. For example, in call transcript 510, every $5^{th}$ word (indicated with parentheses) and its corresponding time in call audio data is stored in call metadata. If the word "I'm" is selected, the times stored in call metadata corresponding to the closest word before (i.e., "Good") and the closest word after (i.e., "calling") are used to perform the interpolation (e.g., t_Good+(4/5×(t_calling−t_Good))).

In some embodiments, recording corresponding times for only some words may be attractive since it reduces the amount of call metadata which much be stored (compared to storing corresponding times for all words in a call transcript). In some embodiments, words that follow long or unusual pauses may have a corresponding time recorded in call metadata. In some applications this is attractive because long or unusual pauses may be difficult to predict using interpolation.

Related section 530 shows other service requests related to the customer shown. In this example, since customer information is already shown in 502, customer information is not repeated in related section 530.

Returning to FIG. 2, in some embodiments, an instruction received at 204 and performed at 208 is associated with applying a policy to data stored by a data management system (e.g., ECM server 112 in FIG. 1). The following shows some such example user interfaces.

Figure 6:
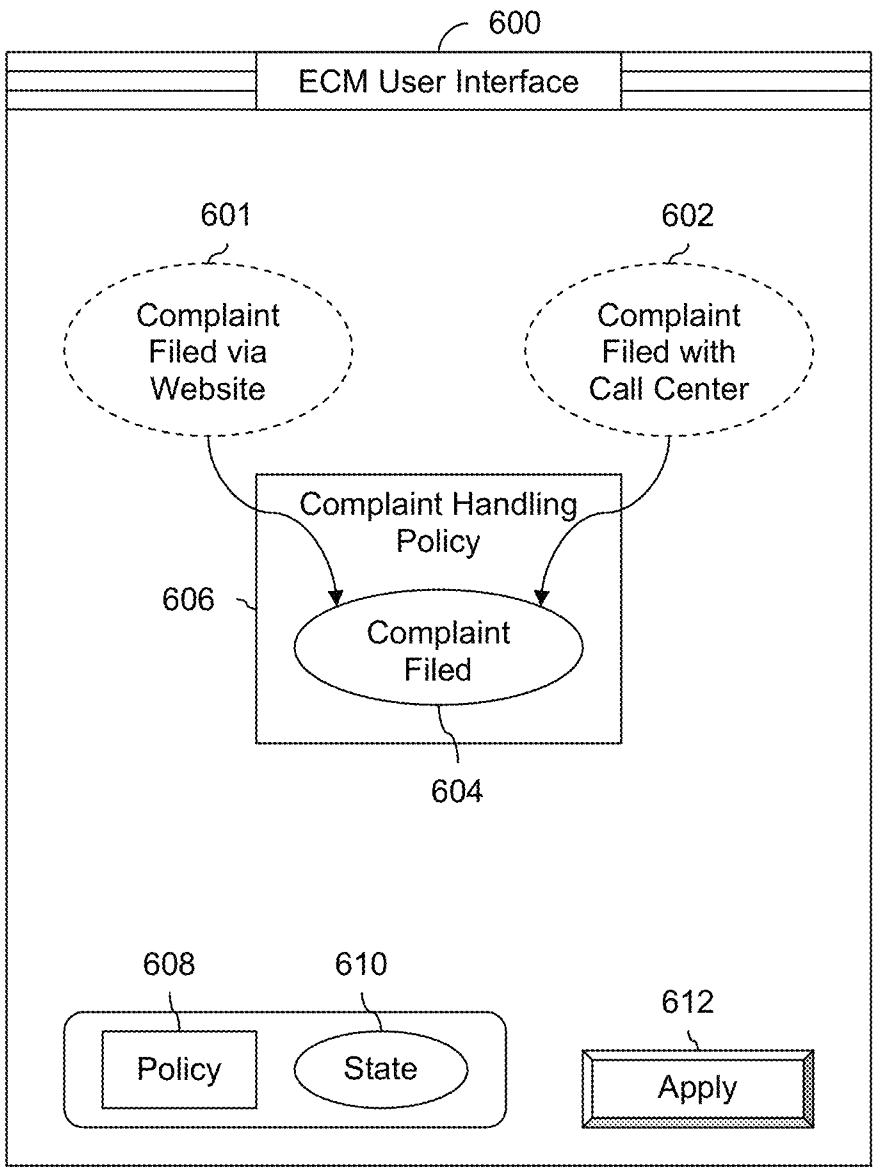
FIG. 6 is a diagram showing an embodiment of a user interface associated with applying a policy to a selected state.

FIG. 6 is a diagram showing an embodiment of a user interface associated with applying a policy to a selected state. In the example shown, user interface 600 is associated with an ECM system (e.g., ECM server 112 in FIG. 1) which is configured to manage data using one or more policies. In some embodiments, multiple policies are applied to data in a given state. In some embodiments, the same policy applies to data in a first state as well as data in a second state. In various embodiments, information in an ECM system moves from one state to another based on user input, after completion of a prescribed task (i.e., an event based state transition), or after a certain amount of time (i.e., a time based state transition).

Complaint handling policy 606 is applied to complaint filed state 604 using user interface 600 so that information (e.g., account information, voice-related information, and/or web-related information) in complaint filed state 604 is handled or managed in the manner described by complaint handling state 604. For illustrative purposes, complaint filed state 604 enters from states 601 or 602; states 601 and 602 may not necessarily exist and/or be required in some systems. In state 601, a complaint is filed via a website. In one example of a complaint filed via a website, a website requires users to classify a submitted communication and if "complaint" is selected from a classification menu, then an object is created in state 601 and that object is migrated to state 604. Pieces of information (e.g., related to the complaint or the customer) may be collected at the website and passed from state 601 to state 604 such as customer name, customer ID, service/product, a transaction date, and a transaction amount.

Complaint filed state 604 may be entered through state 602 where a complaint is filed with a call center. Similar to state 601, complaints may be identified at a call center in a variety of ways (e.g., flagged by a call center operator or by going to a complaint node in a service tree via an automated call center interface). Information associated with the complaint or customer may be gather in state 602 and moved to complaint filed state 604.

Complaint filed state 604 may be entered through other ways not described herein. For example, a customer may write a letter and mail it to the company via the United States Postal Service (USPS).

Regardless of how a complaint is filed, account information associated with the complaint is marked to indicate that a complaint is active. For example, account information includes metadata (e.g., different from data, such as account transaction information); accounts with an active complaint may have a metadata with a metadata field and metadata value of "active complaint" and "yes." To determine what information (e.g., web-related information and/or voice-related information) is affected by complaint handling policy 606, a customer name or account ID is obtained. With the customer name or account ID, related information (such as web-related information or voice-related information) to be managed according to complaint handling policy 606 is determined.

Once in complaint filed state 604, data in that state is managed using complaint handling policy 606. In this example that includes.

- Assigning the complaint to a complaint specialist within the company. For example, an ECM server may have access to the docket of each complaint specialist and assigns the complaint to a complaint specialist with the shortest docket.
- Making the relevant account information, web-related information, and/or voice-related information (e.g., related to the complaint or the complainer) available to the responsible complaint specialist. For example, a link or portal to the information may be sent to the complaint specialist and the information is accessed via some user interface. In some embodiments, if the complaint specialists some other system or application for tracking and resolving complaints (e.g., other than ECM server 112 in FIG. 1), making information available includes exporting or sending the relevant data to the other system or application.

Creating tasks and deadlines (e.g., a deadline for the complaint specialist to review the relevant information, a deadline for the complaint specialist to make a decision, etc.) in a calendar or docket (e.g., so that the complaint specialist or a supervisor can see what tasks have yet to be completed).

Sending reminders and warnings as deadlines approach or are passed.

To apply complaint handling policy 606 to complaint filed state 604, controls 608 and 610 are used. For example, a user may select new state 610 and (left) click on the workspace in user interface 600 to create a new, blank state (not shown). After selecting the new, blank state, a (right) click causes a pull-down menu to be displayed, from which a user selects "complaint filed" from a list of states (not shown). User interface 600 may have access to defined states stored in an ECM system and may present them to a user for selection. Similarly, interacting with new policy 608 may enable a predefined policy to be selected. (Some other interface may be used to create or otherwise define new policies or states and save it to an ECM system.) Dragging complaint handling policy 606 so that it overlaps with complaint filed state 604 in the workspace of user interface 600 and pressing apply button 612 completes the association between the two.

Figure 7:
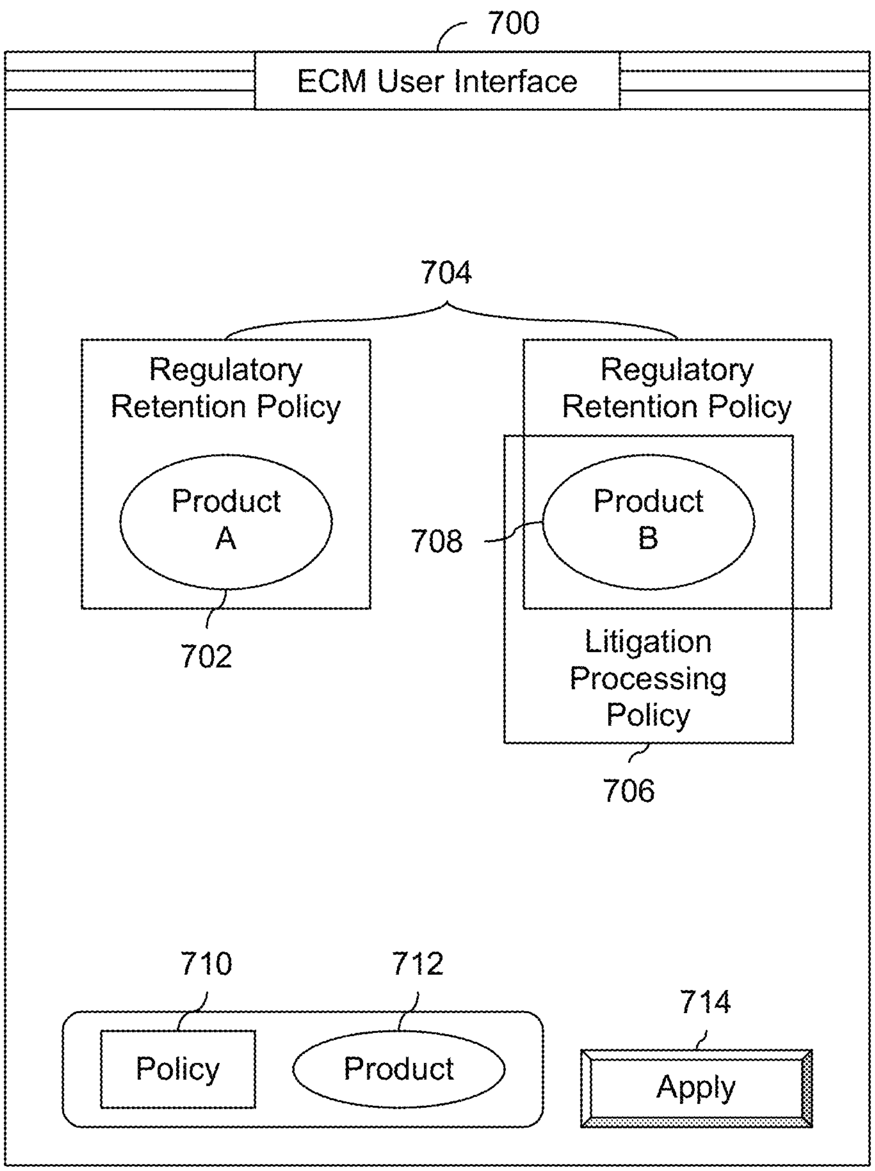
FIG. 7 is a diagram showing an embodiment of a user interface associated with applying a policy to a selected product.

FIG. 7 is a diagram showing an embodiment of a user interface associated with applying a policy to a selected product. In this particular example, the information managed by user interface 700 includes only voice-related information. This example is not intended to be limiting and other embodiments manage other types of information and/or information from other sources.

An exemplary company has two products: Product A and Product B. The company is in the middle of litigation involving Product B; Product A is not part of the litigation. Litigation processing policy 710 is applied to voice-related information associated with product B 708 using user interface. For brevity, processes for applying policies to data associated with a particular product are not described herein; one example was described in FIG. 6.

In this example, litigation processing policy 710 includes:

Retaining call audio data, call transcripts, and call metadata related to Product B indefinitely. For example, discovery rules may require the company to retain (and not delete) all information related to the litigation. In some embodiments, this includes changing an erase permission (e.g., in call metadata) from "erasable" to "not erasable."

Assigning a discovery or evidence identifier (e.g., unique to each call) to the voice-related information (e.g. call audio data, call transcripts, and/or call metadata). This may be used to uniquely identify voice-related information associated with each Product B related call and may be used by both sides (e.g., so that both plaintiff's counsel and defendant's counsel have a unique identifier common to all parties when referring to the evidence).

Creating tasks and deadlines (e.g., a deadline for the voice-related information to be reviewed by a particular side's litigation counsel) in a calendar (e.g., so that litigation counsel can see how much/what information has yet to be reviewed).

Exporting the voice-related information to opposing counsel. For example, discovery rules may require a company to share voice-related information related to the litigation with opposing counsel.

In addition to the application of litigation processing policy 706 to data related to product B 708, user interface 700 is used to apply regulatory retention policy 704 to voice-related information associated with both Product A 702 and Product B. For example, customers of Product A and Product B may be required to listen to a contract agreement and give consent via a call center; the verbally-given consent is recorded and stored in order to comply with regulatory requirements. Or, Product A and Product B may be financial services products (e.g., mutual funds or shares of stock in a company) and SEC regulatory requirements require financial services company to retain calls (e.g., in which customers ask questions about products, in which customers place orders for a fund or stock, etc.) for a certain number of years. As shown in this example, in some embodiments, multiple policies may be associated with or applied to a particular set of data if desired (e.g., policies 704 and 706 are both applied to voice-related information associated with Product B 708).

In some embodiments, voice-related information associated with a particular product is identified using call metadata. For example, call metadata may include a tag of "Product A" or "Product B." In some embodiments, voice-related information associated with a particular product is identified using a call transcript. For example, either an operator or a caller may say the name of the product (e.g., "Product A" or "Product B") and the name of the product may be searched for in a call transcript.

The following figures describe some user interface embodiments associated with a big data analytical system (e.g., big data analytical system 106 in FIG. 1). In some embodiments, a big data analytical system (e.g., compared to an ECM system) is directed to analyzing large amounts of information at a macroscopic level (e.g., as opposed to user interfaces for accessing or manipulating information at a microscopic level, such as by accessing and replaying call audio data for an individual call). Some example questions or insights which may be answered using a big data analytical system user interfaces include: what kinds of questions or requests do callers have when they call into a call center or other voice recorder, what kind of user experiences are callers having when they call in, if customers are interacting with a call center or other voice recorder in a manner anticipated or expected by the company, identification of how the caller experience can be improved upon, etc. The user interface elements and questions posed in the following figures are merely exemplary and are not intended to be limiting.

Figure 8:
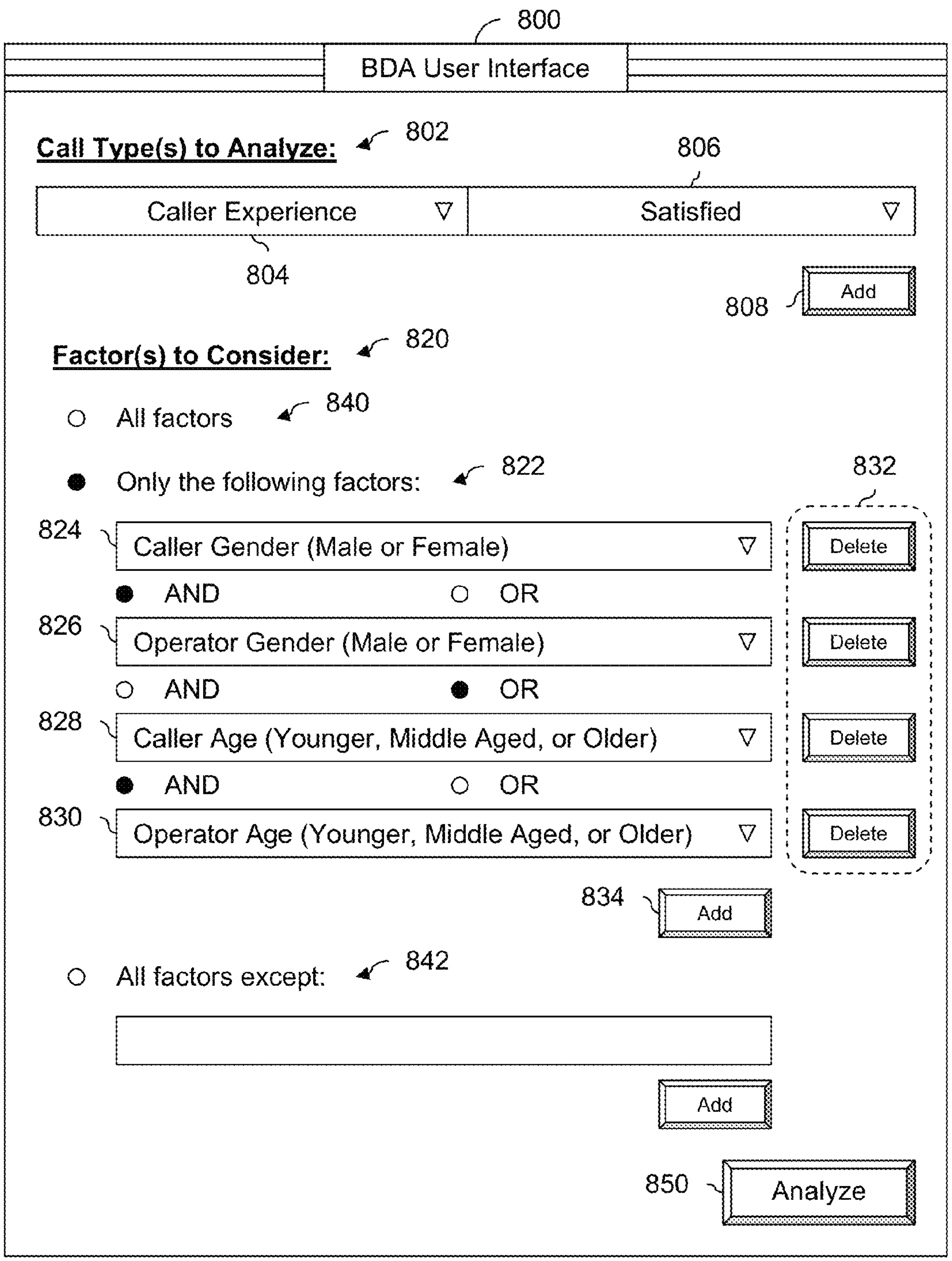
FIG. 8 is a diagram showing an embodiment of a user interface associated with analyzing factors related to satisfied caller experience.

FIG. 8 is a diagram showing an embodiment of a user interface associated with analyzing factors related to satisfied caller experience. In the example shown, user interface 800 is associated with a big data analytical system and has access to voice-related information (e.g., call audio data, call transcripts, and/or call metadata) which is stored and managed by the big data analytical system.

In the example shown, call type(s) to analyze section 802 is used to specify one or more call types to analyze. Using pull down menus provided by user interface 800, "caller experience" has been selected for type 804 and "satisfied" has been selected for value 806. Although a single call type is selected in this example, user interface 800 provides the ability (if desired) to analyze a combination of two or more call types.

Pressing add button 808 causes user interface 800 to be updated with additional pull down menus for selecting an additional call type (not shown). For example, a user may want the combination of "user experience=satisfied" and "placed order=yes" to be analyzed.

Factor(s) to consider section 820 has three options: all factors 840, only the following factors 822, and all factors except 842. If all factors 840 is selected, all possible factors (e.g., stored in a big data analytical system) are considered in analyzing the call type(s) selected in section 802. In this example, only the following factors 822 is selected and the factors: (caller gender 824 AND operator gender 826) OR (caller age 828 AND operator age 830) are specified. To add additional factors, add button 834 may be used; to delete an already-specified factor, the appropriate one of delete buttons 832 is used. When all factors except 842 is selected, all factors are considered except those specified.

Other user interfaces may be configured differently than shown herein. For example, a command line interface may be used where a user inputs the command "run <script>" into a prompt. The script may include one or more call types to analyze (e.g., similar to what section 802 in user interface 800 is used to specify) and one or more (combinations of) factors to consider in the analysis (e.g., similar to what section 820 in user interface 800 is used to specify). A script may be text file which is opened and edited using a text editor (e.g., vi or Emacs).

Once the desired call type(s) and desired factor(s) are specified in user interface 800, analyze button 850 is pressed. The following figures show embodiments of user interface 800 when analysis results are returned.

Figure 9:
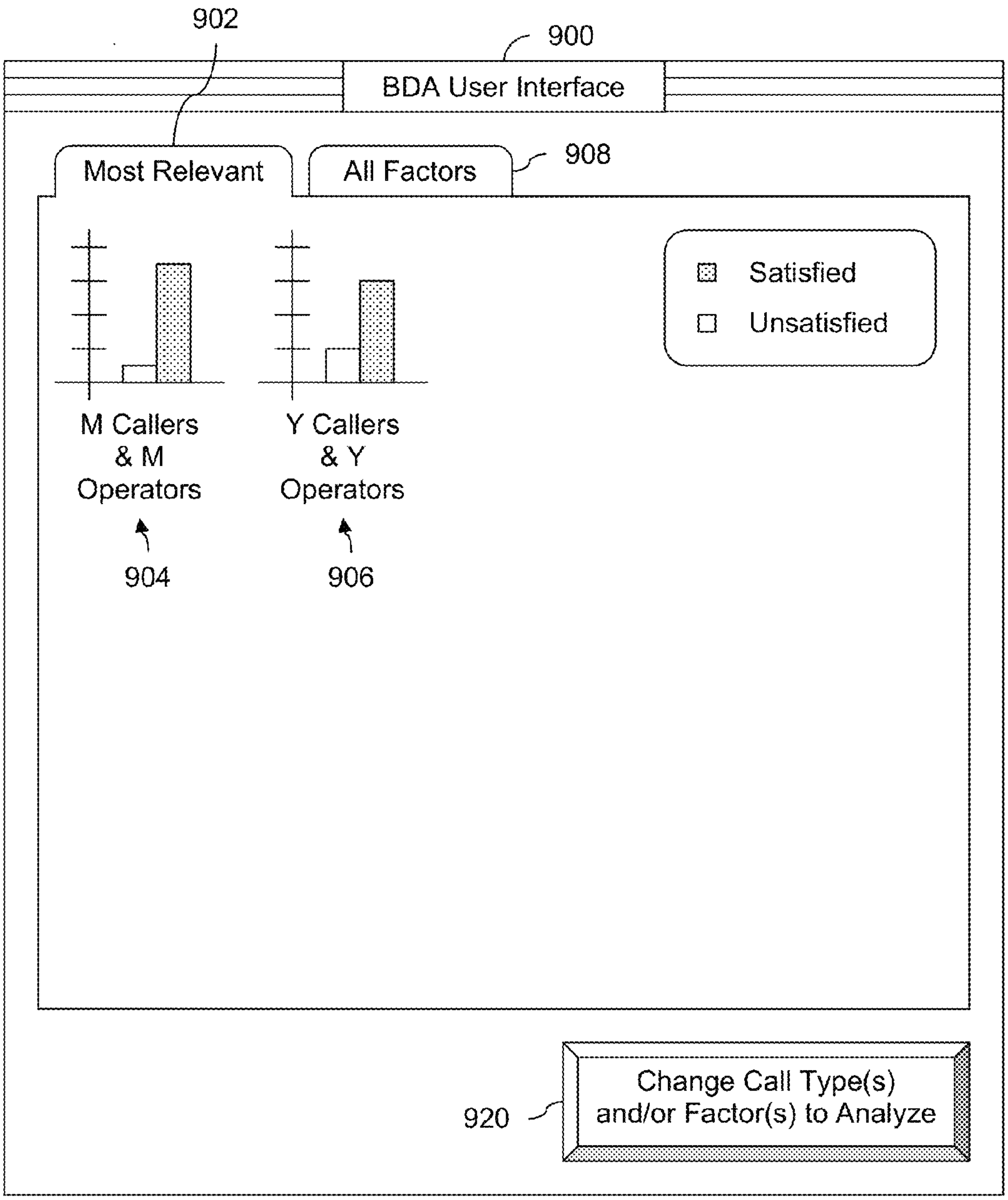
FIG. 9 is a diagram showing an embodiment of a user interface configured to display the most relevant factors in an analysis.

FIG. 9 is a diagram showing an embodiment of a user interface configured to display the most relevant factors in an analysis. FIG. 9 continues the example of FIG. 8.

User interface 900 includes two tabs: most relevant tab 902 (selected in this figure) and all factors tab 908 (selected in the next figure). If most relevant tab 902 is selected, the (combinations of) factors which have a relatively high and/or statistically significant degree of and/or correlation with caller satisfaction. For example, an average percentage of callers who had a satisfying experience (e.g., $\mu_{satisfied}$) may be determined over all of the combination of factors considered (e.g., male callers and male operators, . . . , younger callers and younger operators, . . . ). The combinations of factors shown in most relevant tab 900 may have a satisfaction level that is at least one standard deviation greater than the average amount (e.g., greater than or equal to $\mu_{satisfied}+\sigma_{satisfied}$). This is one example of selecting (combinations of) factors which are statistically significant. In an example where (combinations of) factors with relatively high caller satisfaction are displayed in most relevant tab 902, the N (combinations of) factors (e.g., N would be 2 in this example) with the highest satisfaction levels are displayed in most relevant tab 902.

In some embodiments, a caller's experience (e.g., "satisfied" or "not satisfied") is stored in call metadata and call metadata is searched for a field/value combination of "caller experience"/"satisfied." Alternatively, a tag of "satisfied" (e.g., without "user experience") is searched for in call metadata. In some embodiments, a call transcript is searched for words which are strongly indicative of being satisfied (e.g., if operators have scripted responses, searching for a scripted response which is only used when a caller is satisfied) or not satisfied (e.g., scripted responses by the operator employed only when a caller is not satisfied, a caller swears during a call, etc.). This enables a system to divide voice-related information into a group which is associated with a caller experience of "satisfied" (which will be analyzed) and a group which is not associated with a caller experience of "satisfied" (which will not be analyzed).

In some embodiments, the gender and age of the caller and operator are stored in call metadata and call metadata is searched in order to determine which combination of factors voice-related information being analyzed falls into. In some embodiments voice server 110 in FIG. 1 performs an analysis of call audio data, determines the age and gender of the caller and operator, and then stores that information in call metadata. The voice-related information (including call metadata with the age and gender of the caller and operator) is then passed from voice server 110 to big data analytical system 106 where is stored and used in the analysis. This enables a system to divide voice-related information associated with a caller experience of "satisfied" according to caller/operator gender, as well as caller/operator age.

If desired, a user can change the call type(s) and/or factor(s) analyzed using button 920. For example, they may want to increase/decrease the number of factors considered. Pressing button 920 (at least in this example) causes user interface 800 in FIG. 8 to be displayed.

Figure 10:
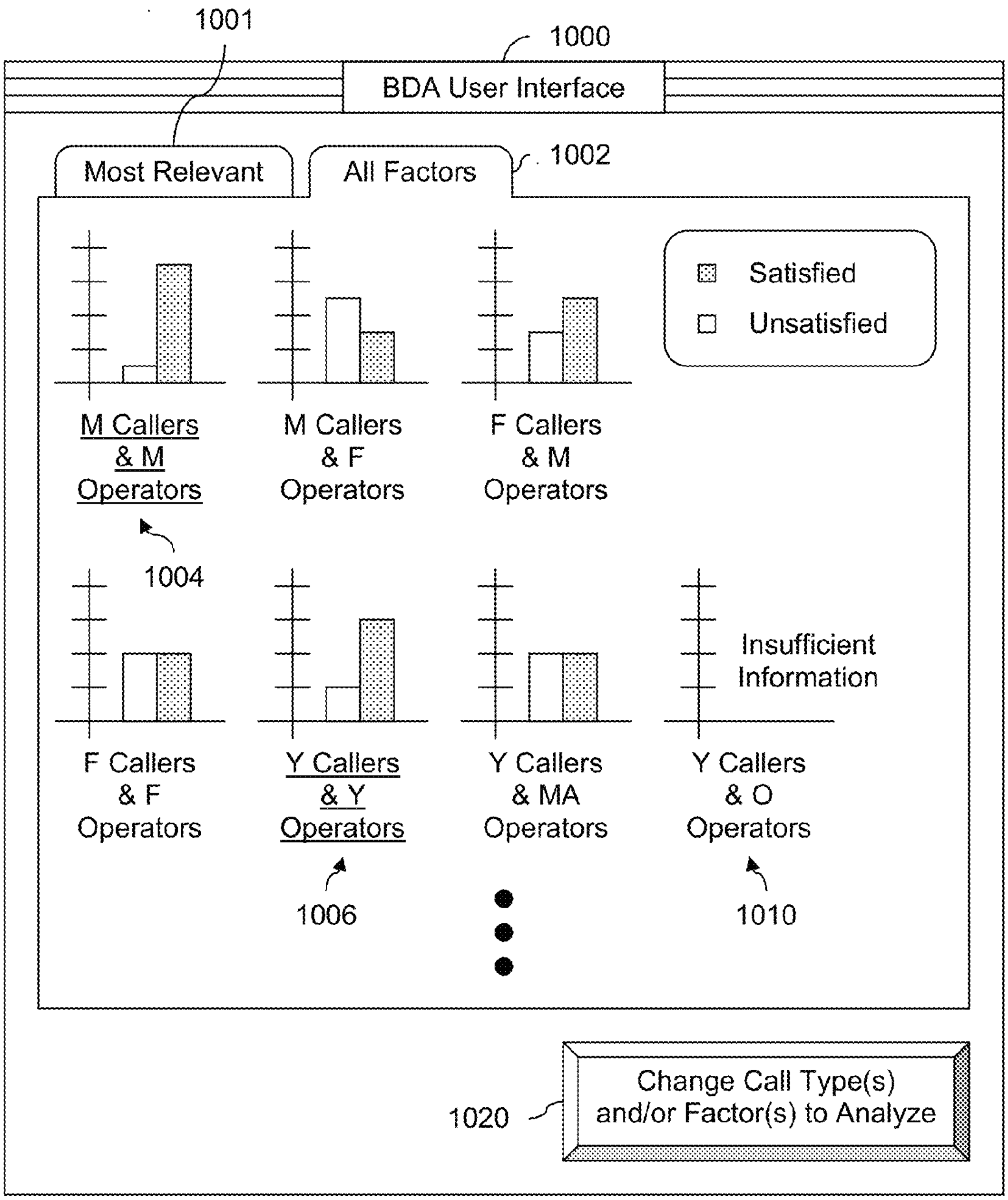
FIG. 10 is a diagram showing an embodiment of a user interface configured to display all factors considered in an analysis.

FIG. 10 is a diagram showing an embodiment of a user interface configured to display all factors considered in an analysis. FIG. 10 continues the examples of FIGS. 8 and 9. In this example, all factors tab 1002 is selected in user interface 1000. Caller satisfaction for all combinations of factors (e.g., male callers and male operators, male callers and female operators, . . . , younger callers and younger operators, younger callers and middle aged operators, . . . ) are display in all factors tab 1002. Factors which are most relevant (displayed when most relevant tab 1001 is selected) are indicated or otherwise flagged. In this particular example, the most relevant factors 1004 and 1006 are indicated (e.g., differentiated from factors which are not the most relevant) with an underline, but other indicators may be used such as font color, font size, capitalization, border color (e.g., around the chart and/or chart labels), border thickness, bold, or italics.

In this example, the combination of younger callers and older operators 1010 is indicated to have insufficient information. For example, operators may tend to be either younger or middle aged, and there may be too few samples with older operators to be presented (e.g., because results obtained from a small sample may be misleading).

As in the previous figure, a user may change the call type(s) and/or factor(s) analyzed by pressing button 1020, causing user interface 800 in FIG. 8 to be displayed.

Returning to FIG. 2, in some embodiments, an instruction received at 204 and/or performed at 208 is associated with performing an analysis, such as the exemplary analysis performed in FIGS. 8-10. For example, determining at 206 in FIG. 2 may include determining what voice-related information is associated with a caller experience of "satisfied" (e.g., identified using call metadata and/or a call transcript). Performing an instruction at 208 in this example may include statistically analyzing the relevant voice-related information (e.g., associated with calls where the caller was satisfied) to determine (for each combination of caller/operator gender and caller/operator age) a degree or amount of callers who had a satisfying experience, and then identifying those combinations (e.g., male callers and male operators) which are the most relevant (e.g., because it is a standard deviation above a mean degree or amount of callers who had a satisfying experience, or it is one of the highest degrees or amounts across the combinations considered).

In some embodiments, a big data analytical system manages data associated with or coming from a variety of sources.

For example, in addition to voice-related information (e.g., coming from or associated with a voice recorder, such as a call center), web-related information (i.e., originating from or associated with interaction with a website) may be managed by a big data analytical system. Oftentimes, in addition to providing customer service through a call center, companies have a website where information is exchanged between the customer and company (e.g., where customers can view information about products and/or services, where customers can access their accounts online, where customers can joining a mailing list, etc.). In some embodiments, account related information (e.g., any information which would be included in an account statement, such as account transactions) is managed by a big data analytical system. The following figures show some embodiments of a user interface where information from a variety of sources is analyzed by a big data analytical system.

Figure 11:
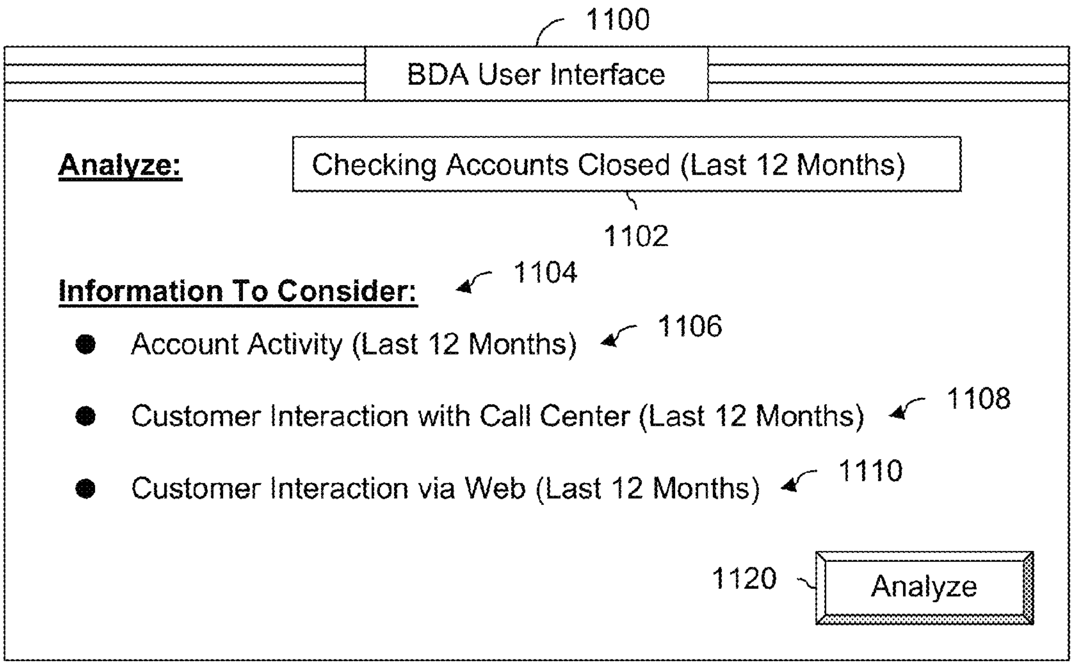
FIG. 11 is a diagram showing an embodiment of a user interface configured to analyze information from a variety of sources.

FIG. 11 is a diagram showing an embodiment of a user interface configured to analyze information from a variety of sources. In the example shown, user interface 1100 has access to information stored in a big data analytical system, including account activity information, voice-related information, and web-related information. User interface 1100 is (in this example) used to store and analyze information associated with a bank.

User interface 1100 includes analysis input 1102 and information to consider section 1104. In analysis input 1102, "checking accounts (last 12 months)" has been specified. In some other embodiments, some other types of account activity are specified in 1102 (e.g., purchases, returns, upgrades, delinquencies, etc.). Information to consider section 1104 is used to specify what data should be considered in the analysis. Account activity (last 12 months) 1106 relates to account related information. One example of account information (for this bank example) is transaction information, such as deposits (e.g., a deposit amount; a date of a deposit; and whether a deposit is in cash, a check, or an electronic transfer); withdrawals (including details described previously for deposits); and fees or charges. In some embodiments, account information includes information not directly related to transactions, such as member type or standing, creditworthiness, and interest rate.

Customer interaction with call center (last 12 months) 1108 relates to voice-related information. Some examples have been described above and include call audio data, a call transcript, and call metadata.

Customer interactions via the Web (last 12 months) 1110 relates to web-related information. Some examples of web-related information include: a number of times a website is accessed, actions initiated or performed via the website, whether a user has completed some optional steps (e.g., setting up optional password recovery information, has selected a login image as part of an optional security measure, etc.), and so on.

Once the desired analysis input and information to consider have been specified, the analysis is initiated by pressing analyze button 1120. In this particular example, all of options 1106, 1108, and 1110 are selected.

Figure 12:
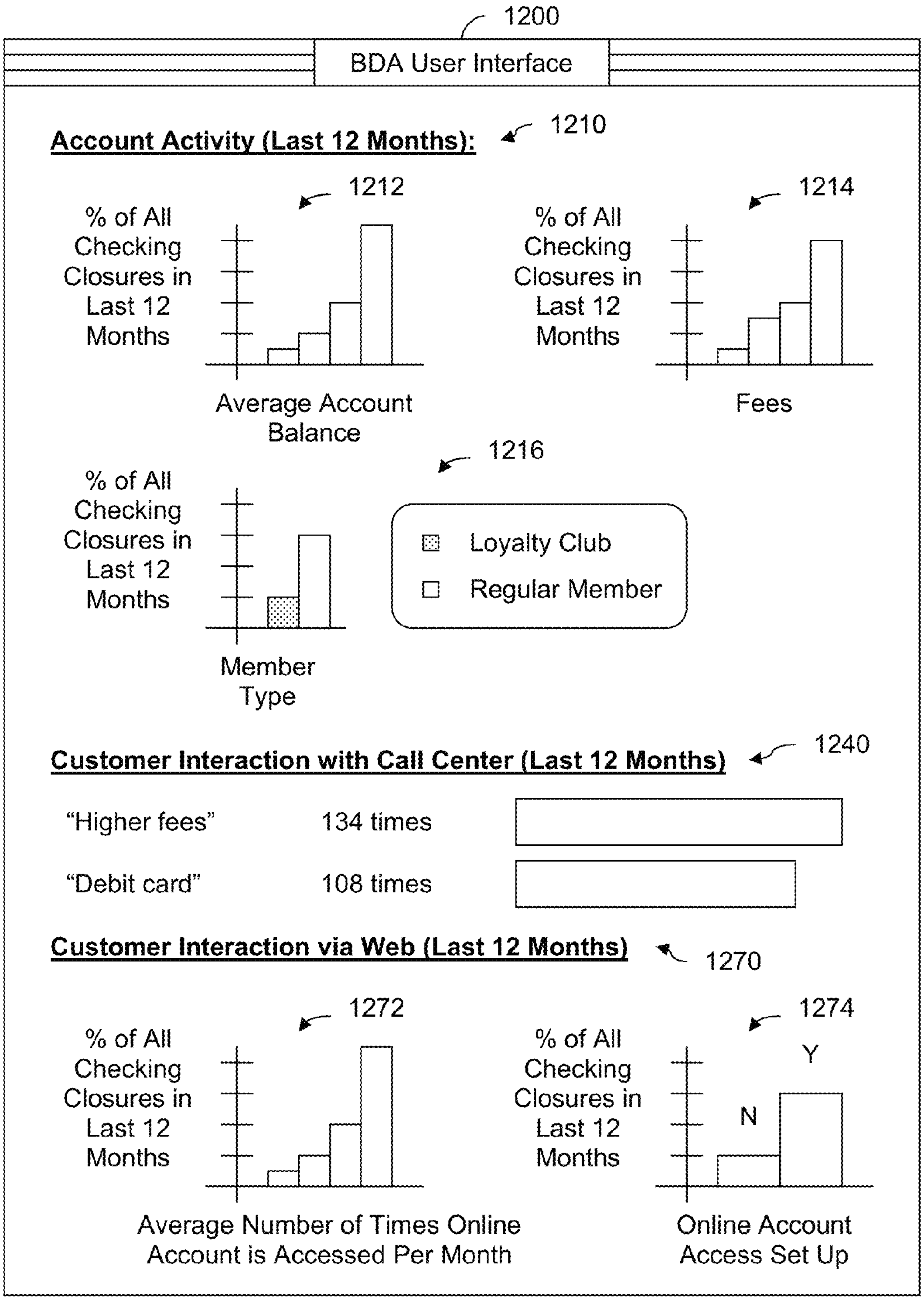
FIG. 12 is a diagram showing an embodiment of a user interface configured to display analysis results from a variety of sources.

FIG. 12 is a diagram showing an embodiment of a user interface configured to display analysis results from a variety of sources. FIG. 12 continues the example of FIG. 11. The big data analytical system has analyzed the specified information (e.g., account information, web-related information, and voice-related information) associated with checking accounts closed in the last 12 months and has selected the most relevant for display (e.g., some example selection techniques were described above in association with FIG. 9).

Section 1210 shows account information over the last 12 months which is determined to be the most relevant to checking account closures in the last 12 months. As shown in graph 1212, as average account balance increases, the percentage of all checking account closures in the last 12 months also increases. For example, people with relatively large average balances may have enough cash on hand so that any cash flow disruptions caused by changing banks does not result in late payments on rent, bills, and so on. In contrast, people with relatively low average balances may live from paycheck to paycheck and changing banks would be a significant financial disruption and so they tend not to change banks.

Graph 1214 shows that higher fees correspond to higher rates of account closures. For example, higher fees may cause customers to be disgruntled and move their account to another bank whereas customer with no or lower fees may not be as incentivized to change banks. In this example, user interface 1200 is interactive so that clicking on any of the "bars" in graph 1214 causes a breakdown in fees to be displayed (e.g., how much is from overdraft fees, how much is from a monthly checking account fee, etc.). In some embodiments, user interface 1200 is able to (if desired by a user) compare different types of fees so that insight into which fees have a higher correlation with checking account closures may be obtained.

Graph 1216 shows that account closures in the past 12 months tended to be members who are regular members as opposed to loyalty club members. The exemplary bank designates customers who meet certain parameters to be members of a Loyalty Club where reduced or no fees are charged for Loyalty Club members; regular members are charged higher or full fees. Some example parameters for being a member of the exemplary Loyalty Club include: a relatively high account balance, having direct deposit set up, having multiple accounts (e.g., mortgage and checking account), or using certain services (e.g., using a bill pay service or a debit card issued by the bank).

Section 1240 shows voice-related information determined during the analysis to be the most relevant to checking account closures. In the example shown, "higher fees" occurred in the voice-related information 134 times (e.g., in a call transcript or in a tag in call metadata) and "debit card" occurred in the voice-related information 108 times. The information displayed in 1240 may give clues as to what customers care about and, thus, what might have caused a customer to close their account.

Section 1270 shows web-related information determined during the analysis to be the most relevant to checking account closures in the past 12 months. Graph 1212 shows that the percentage of account closures in the last 12 months increases as the average number of times an online account is accessed per month increases. For example, customers who frequently access their online account may tend to keep close tabs on things like interest rates and fees and may be more likely to move their account to a bank with more favorable interest rates or fees compared to someone who does not monitor their account as frequently (i.e., never or rarely accesses their online account). Although not shown herein, in some embodiments, user interface 1200 includes one or more "show more" buttons. For example, there may be a "show more" button for each of sections 1210, 1240, and 1270 which would should more results for each type of information.

In this example, the analysis begins by searching through account information to determine what accounts have closed in the last 12 months. For example, in metadata there may be a field of "account closing date" and if the value is within the last 12 months (e.g., accounts which are open may have a value of "N/A" or some other value indicating the account is open), then an account number is obtained from the account information. The account number is then used to identify voice-related information and web-related information associated with accounts closed in the last 12 months.

In some embodiments, the analysis described in FIGS. 11 and 12 is used to make changes to a system or how a company does business (referred to hereinafter as process management). For example, the bank may try to keep customers by reducing or eliminating fees for customers who meet one or more of the following criteria: they have a relatively large (average) account balance, they current have fees which are relatively high, they are not members of a Loyalty Club or other group receiving preferential treatment, they access their online account a relatively high number of times, or they have online account access set up. In some embodiments, changes are made on a test basis (e.g., a process management test).

Returning to FIG. 2, the example analysis described in FIGS. 11 and 12 show one embodiment of steps 204, 206, and 208 in FIG. 2. In this example, determining at step 206 in FIG. 2 includes determining what account information, call-related information, and web-related information (e.g., based on the selection of options 1106, 1108, and 1110 in FIG. 11) relates to checking accounts which were closed in the last 12 months (e.g., based on the analysis input at 1102). In this example, step 208 in FIG. 2 includes determining what account information, call-related information, and web-related information determined at step 206 is (most) relevant or closely related to checking accounts closed in the last 12 months.

In some embodiments, a user interface (some examples of which are shown in FIGS. 3-12) is associated with and/or provided by an Internet browser application (e.g., Microsoft Internet Explorer, Mozilla Firefox, Google Chrome, etc.). In some embodiments, a user interface is part of a suite of applications associated with and/or provided by a data management system or an ECM system.

Analysis of information (including but not limited to voice-related information) enables a company to make improvements to its operations. Some embodiments of user interfaces which may be used to perform analyses are described above in FIGS. 8-12. In the case of FIGS. 8-10, an example change is to configure a call center to assign male callers to male operators if available. Similarly, a call center may be configured to assign younger callers to younger operators if available. Gender and age of callers may be determined by first identifying the caller, for example by customer name or account number, before assigning or forwarding the caller to an operator.

In some embodiments, a change to a system (e.g., assigning male callers to male operators or assigning younger callers to younger operators) is implemented on a test or experimental basis. For example, 10% of callers to a call center may have a test experience (e.g., a test of how callers are assigned to operators, a test of a new automated voice interface, a test of what products are pitched during a call, etc.) and the other 90% may have a regular or standard call experience (e.g., they are assigned without considering caller/operator gender or age). Voice-related information for the 10% of callers who have the test experience may be flagged by including in corresponding voice metadata a tag indicating the test (e.g., a tag of "M-M assignment test" or "new voice recognition system"). Using such tags, subsequent analyses may be performed to determine (for example) whether the experiment was successful, what bugs need to be worked out in the experience being tested, and/or whether the experiment should be rolled out to more callers.

When evaluating a text experience, it may be useful to have a control group to compare against the test group. In some embodiments, a user interface provides a service or tool for (e.g., automatically) determining or generating a control group corresponding to a specified test experience or test group. For example, a user may input the command "evaluate <test>-generate control group" where generate control group is an option for the evaluate command or "generate control group <test>." The system may then identify a control group (e.g., as part of the evaluation of the test), including by determining a minimum number of members in the control group (e.g., in order to be statistically meaningful). In some embodiments, determining a control group includes identifying characteristics for one or more test subjects who had the test experience and identifying callers with similar characteristics who did not have the test experience.

Figure 13:
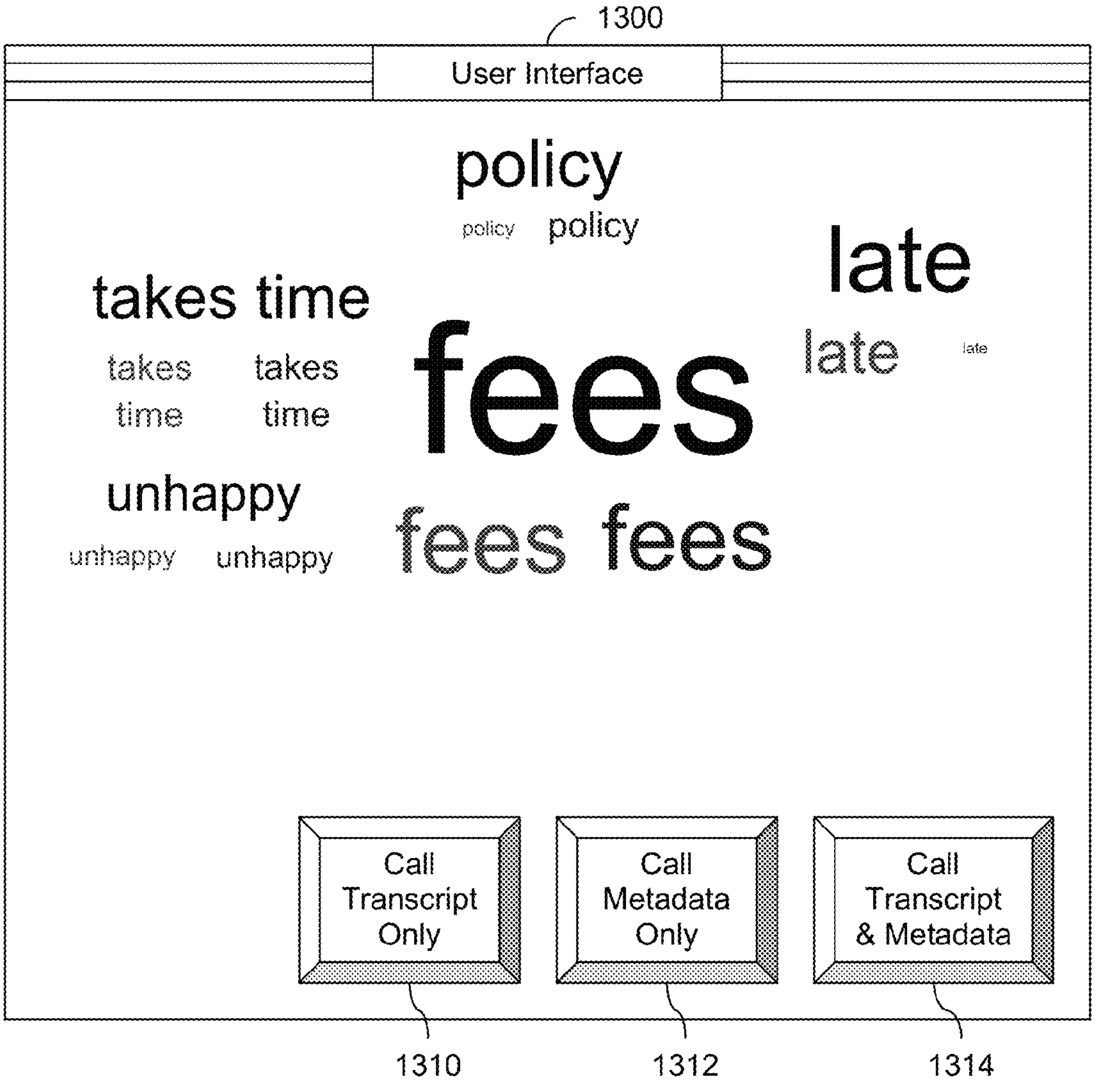
FIG. 13 is a diagram showing an embodiment of a user interface configured to display a tag cloud.

FIG. 13 is a diagram showing an embodiment of a user interface configured to display a tag cloud. In a tag cloud, one example of which is displayed in user interface 1300, tags are displayed where the font size of a given tag indicates an importance or quantity associated with that tag. For example, font size may correspond to the number of times the tag occurs in voice metadata and/or call transcript(s). In some embodiments, the position of a tag (e.g., in addition to font size) indicates or corresponds to an importance or quantity associated with that tag (e.g., tags which are more important or have a higher quantity associated with them are located closer to the center of the tag cloud).

In this example, user interface 1300 has three modes. If call transcript only button 1310 is selected, the tags which are selected to be displayed and font sizes of the displayed tags are determined only from call transcript information without taking into consideration call metadata. For example, it may be the number of times a tag occurs in one or more call transcripts where the count excludes the number of times that tag occurs in call metadata. If call metadata only button 1312 is selected, only call metadata is used to determine what tags to display and what font sizes those tags are to be displayed at (e.g., without taking into consideration a call transcript). If call transcript and metadata button 1314 is selected, both call metadata and call transcript information is used to select tags to display and determine what font size to display them at.

In the example shown, call transcript and metadata 1314 is selected and user interface 1300 displays tag cloud information for both call transcript information and call metadata (e.g., top tag in each triplet), for just call transcript information (e.g., bottom left tag in each triplet), and for just call metadata (e.g., bottom right tag in each triplet). Displaying a triplet as shown in user interface 1300 enables a user to know the contribution from call transcript information versus the contribution from call metadata when call transcript and metadata button 1314 is selected.

In some embodiments, a user interface (e.g., associated with searching, assigning a policy to data, and/or analyzing information) is configured to display a tag cloud, such as the tag cloud shown in user interface 1300. For example, section 1240 in FIG. 12 may be presented as a tag cloud where the font size of "higher fees" would be larger than the font size of "debit card."

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving an instruction associated with applying an information management policy, wherein the instruction includes one or more criteria which specifies information to which the information management policy applies;

using a processor to determine, based at least in part on the criteria, voice-related information in storage to which the instruction applies, wherein:

the voice-related information includes call audio data, a call transcript, and call metadata associated with a call; and the voice-related information to which the instruction applies is determined by comparing the criteria to the call metadata; and performing the instruction on the determined voice-related information, including by applying the information management policy to the voice-related information so that the voice-related information is managed in the manner specified by the information management policy.

2. The method recited in claim 1 further comprising:

receiving the voice-related information at an enterprise content management (ECM) system; and storing the voice-related information in the ECM system, wherein the instruction is performed by the ECM system.

3. The method recited in claim 1, wherein performing the instruction includes searching the voice-related information using one or more search criteria.

4. The method recited in claim 3, wherein the search criteria includes one or more of the following: a customer identifier, a customer name, a service request identifier, a call date, a call length, a voice recorder identifier, a resolution status, one or more words used in a call, a caller experience, a business unit, a product, a service, or a policy.

5. The method recited in claim 3 further comprising one or more of the following: (1) displaying a search result, including by displaying a user interface control associated with playing call audio data associated with the search result or (2) displaying a search result, including by displaying a call transcript associated with the search result.

6. The method recited in claim 1 further comprising:

receiving, from the displayed call transcript associated with the search result, at least one selected word; and in response to receiving the at least one selected word, playing call audio data associated with the search result beginning at a time corresponding to the at least one selected word.

7. The method recited in claim 6 further comprising determining the time corresponding to the at least one selected word, including by:

accessing call metadata associated with the search result; and in the event the at least one selected word is stored in the call metadata associated with the search result, obtaining, from the call metadata associated with the search result, the time corresponding to the at least one selected word.

8. The method recited in claim 7, wherein determining the time further includes in the event the at least one selected word is not stored in the call metadata associated with the search result:

obtaining, from the call metadata associated with the search result, a first time corresponding to a word prior to the at least one selected word in the call transcript associated with the search result;

obtaining, from the call metadata associated with the search result, a second time corresponding to a word after to the at least one selected word in the call transcript associated with the search result; and interpolating the time using the first time and the second time.

9. The method recited in claim 1 further comprising:

receiving at least one word to search for within the call transcript associated with the search result; and indicating, within the displayed call transcript associated with the search result, the at least one word to search for.

10. The method recited in claim 1, wherein performing the instruction includes analyzing caller experience, wherein the analysis takes into consideration at least one of the following: gender or age.

11. The method recited in claim 10, further comprising:

receiving voice-related information associated with a caller experience test; and performing an analysis on the voice-related information associated with the caller experience test.

12. The method recited in claim 11, further comprising generating a control group for the caller experience test, including by identifying one or more characteristics of a test subject associated with the caller experience test.

13. The method recited in claim 1, wherein performing the instruction includes analyzing account activity, wherein the analysis takes into consideration at least one of the following: account information, voice-related information, or web-related information.

14. The method recited in claim 13, further comprising:

receiving voice-related information associated with a process management test; and performing an analysis on the voice-related information associated with the process management test.

15. The method recited in claim 14, further comprising generating a control group for the process management test, including by identifying one or more characteristics of a test subject associated with the process management test.

16. A system, comprising:

a processor; and a memory coupled with the processor, wherein the memory is configured to provide the processor with instructions which when executed cause the processor to:

receive an instruction associated with applying an information management policy, wherein the instruction includes one or more criteria which specifies information to which the information management policy applies;

determine, based at least in part on the criteria, voice-related information in storage to which the instruction applies, wherein:

the voice-related information includes call audio data, a call transcript, and call metadata associated with a call; and the voice-related information to which the instruction applies is determined by comparing the criteria to the call metadata; and perform the instruction on the determined voice-related information, including by applying the information management policy to the voice-related information so that the voice-related information is managed in the manner specified by the information management policy.

17. The system recited in claim 16, wherein performing the instruction includes searching the voice-related information using one or more search criteria.

18. The system recited in claim 17, wherein the memory is further configured to provide the processor with instructions which when executed cause the processor to display a search result, including by displaying a call transcript associated with the search result.

19. The system recited in claim 18, wherein the memory is further configured to provide the processor with instructions which when executed cause the processor to:

receive, from the displayed call transcript associated with the search result, at least one selected word; and in response to receiving the at least one selected word, play call audio data associated with the search result beginning at a time corresponding to the at least one selected word.

20. A computer program product, the computer program product being embodied in a non-transitory computer readable storage medium and comprising computer instructions for:

receiving an instruction associated with applying an information management policy, wherein the instruction includes one or more criteria which specifies information to which the information management policy applies;

determining, based at least in part on the criteria, voice-related information in storage to which the instruction applies, wherein:

the voice-related information includes call audio data, a call transcript, and call metadata associated with a call; and the voice-related information to which the instruction applies is determined by comparing the criteria to the call metadata; and performing the instruction on the determined voice-related information, including by applying the information management policy to the voice-related information so that the voice-related information is managed in the manner specified by the information management policy.

21. The computer program product recited in claim 20, wherein the computer instructions for performing the instruction include computer instructions for analyzing caller experience, wherein the analysis takes into consideration at least one of the following: gender or age.

22. The computer program product recited in claim 20, wherein the computer instructions for performing the instruction include computer instructions for analyzing account activity, wherein the analysis takes into consideration at least one of the following: account information, voice-related information, or web-related information.

23. The method recited in claim 1, wherein the information management policy includes a data retention policy which dictates retention of the voice-related information.

24. The system recited in claim 16, wherein the information management policy includes a data retention policy which dictates retention of the voice-related information.

25. The computer program product recited in claim 20, wherein the information management policy includes a data retention policy which dictates retention of the voice-related information.

26. The method recited in claim 1, wherein the information management policy includes an access policy which dictates access to the voice-related information.

27. The system recited in claim 16, wherein the information management policy includes an access policy which dictates access to the voice-related information.

28. The computer program product recited in claim 20, wherein the information management policy includes an access policy which dictates access to the voice-related information.

* * * * *